(12) United States Patent
Srinivasachar

(10) Patent No.: US 7,886,019 B2
(45) Date of Patent: Feb. 8, 2011

(54) SERVICE ORIENTED ARCHITECTURE AUTOMATION BY CAB OR TAXI DESIGN PATTERN AND METHOD

(75) Inventor: Nagaraj C. Srinivasachar, Suwanee, GA (US)

(73) Assignee: International Business Machines Corporation, Armonk, NY (US)

( * ) Notice: Subject to any disclaimer, the term of this patent is extended or adjusted under 35 U.S.C. 154(b) by 1196 days.

(21) Appl. No.: 11/514,713

(22) Filed: Aug. 31, 2006

(65) Prior Publication Data

US 2008/0075267 A1    Mar. 27, 2008

(51) Int. Cl.
  G06F 15/16    (2006.01)
  G06F 15/173    (2006.01)
  G06F 15/177    (2006.01)
(52) U.S. Cl. .................. 709/217; 709/203; 709/224
(58) Field of Classification Search .................. 709/217, 709/224, 203; 707/693
See application file for complete search history.

(56) References Cited

U.S. PATENT DOCUMENTS

| | | | | |
|---|---|---|---|---|
| 6,330,499 | B1 * | 12/2001 | Chou et al. .................. | 701/33 |
| 6,339,736 | B1 * | 1/2002 | Moskowitz et al. ........... | 701/29 |
| 6,993,585 | B1 | 1/2006 | Starkovich et al. | |
| 6,993,743 | B2 | 1/2006 | Crupi et al. | |
| 7,231,267 | B2 * | 6/2007 | Bournas et al. ............... | 700/91 |
| 2004/0162741 | A1 | 8/2004 | Flaxer et al. | |
| 2005/0022198 | A1 | 1/2005 | Olapurath et al. | |
| 2005/0044197 | A1 | 2/2005 | Lai | |
| 2005/0091374 | A1 | 4/2005 | Ganesan et al. | |
| 2005/0125768 | A1 | 6/2005 | Wong et al. | |
| 2005/0132381 | A1 | 6/2005 | Fiammante et al. | |
| 2005/0204054 | A1 * | 9/2005 | Wang et al. ................. | 709/232 |
| 2005/0240422 | A1 | 10/2005 | Doyle et al. | |

(Continued)

OTHER PUBLICATIONS

Ciurbera et al., "Metadata-Driven Middleware for Web Services", Proceedings of the Fourth International Conference on Web Information Systems Engineering (WISE'03) 2003, pp. 1-6, Dec. 31.

(Continued)

Primary Examiner—Haresh N Patel
(74) Attorney, Agent, or Firm—Yee & Associates, P.C.; John R. Pivnichny

(57) ABSTRACT

Computer implemented method, system, and computer usable program code for handling service requests. A service request is received at one service provider of a plurality of service providers, each service provider adapted to receive service requests from service requesters and being in communication with middleware software and with one another. The received service request is sent to one service acceptor of a plurality of service acceptors, each also being in communication with the middleware software and with one another. If the one service acceptor is able to process the request, the one service acceptor processes the request and sends a response back to the one service provider and to each other of the plurality of service acceptors. If the one service acceptor is unable to process the request, the one service acceptor determines if another service acceptor is able to process the request and notifies the middleware software. A service acceptor that is able to process the request accepts and processes the request and provides a result. Overall Service Requestors, Service Providers, Service Stations (middleware) and Service Acceptors communicate among themselves and maintain respective logs to further make it the invention as an automated process.

2 Claims, 3 Drawing Sheets

U.S. PATENT DOCUMENTS

| | | |
|---|---|---|
| 2006/0047742 A1 | 3/2006 | O'Neill et al. |
| 2006/0095584 A1 | 5/2006 | Deolaliker et al. |
| 2006/0212855 A1* | 9/2006 | Bournas et al. ............. 717/140 |
| 2007/0011126 A1* | 1/2007 | Conner et al. ................. 706/47 |
| 2007/0016429 A1* | 1/2007 | Bournas et al. ................. 705/1 |
| 2007/0061731 A1* | 3/2007 | Dillon et al. ................ 715/733 |
| 2007/0157167 A1* | 7/2007 | Brendle et al. ............. 717/120 |
| 2007/0192706 A1* | 8/2007 | Bruce et al. ................ 715/742 |
| 2007/0240102 A1* | 10/2007 | Bello et al. ................. 717/104 |
| 2007/0255529 A1* | 11/2007 | Biazetti et al. ............. 702/186 |
| 2008/0052314 A1* | 2/2008 | Batabyal ................. 707/104.1 |

OTHER PUBLICATIONS

Lee et al., "A Service-Oriented Architecture for Design and Development of Middleware", Proceedings of the 12$^{th}$ Asia-Pacific Software Engineering Conference (APSEC'05), 2005, pp. 1-5, Dec. 31.

* cited by examiner

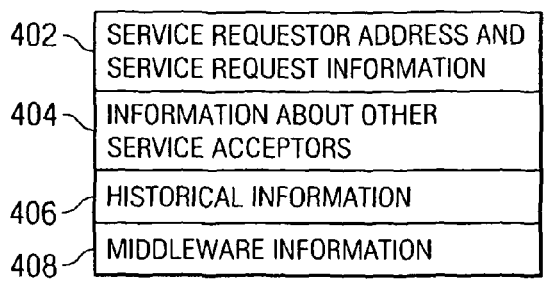
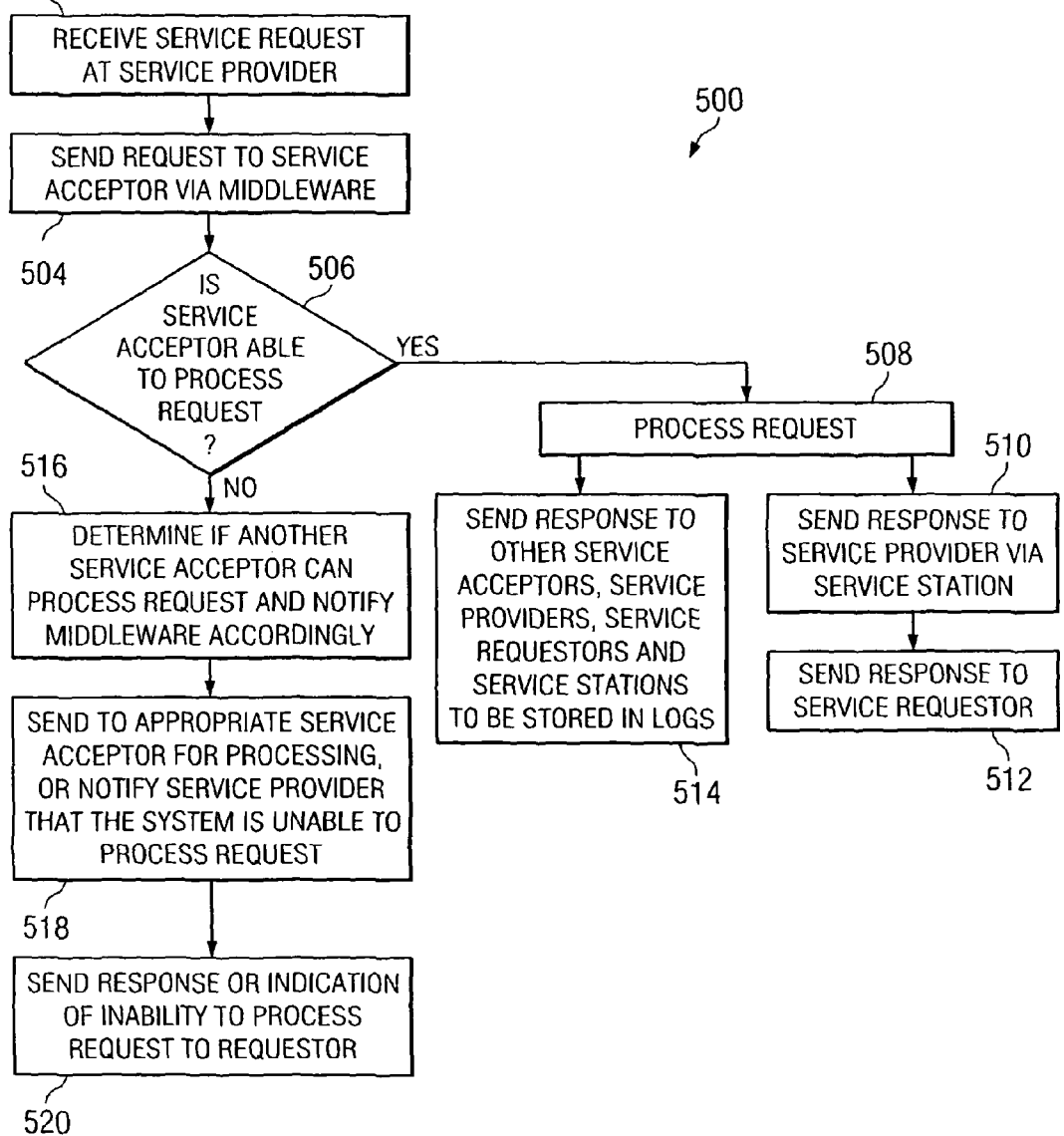

SERVICE ORIENTED ARCHITECTURE AUTOMATION BY CAB OR TAXI DESIGN PATTERN AND METHOD

BACKGROUND OF THE INVENTION

1. Field of the Invention

The present invention relates generally to the data processing field, and more particularly, to a computer implemented method, system and computer usable program code for handling service requests in a data processing system, and for software development.

2. Description of the Related Art

A Service-Oriented Architecture (SOA) is a collection of services that communicate with one another over a network in order to carry out business processes.

Communication in an SOA can involve the simple passing of data or it can involve two or more services that coordinate some activity. Such services are loosely coupled (meaning that one application does not need to know the technical details of another application in order to communicate with the other application), have well-defined platform independent interfaces, and are reusable.

In general, a service-oriented approach enables one or more businesses to link together fragmented data and business processes in order to create a more complete view of operations. For example, a retail business deciding whether to issue a credit card to a customer can use SOA technology to tap different available sources to pull together information on the customer's credit worthiness and buying habits. A bank can use the same SOA to handle account transfers whether they originate from a teller, an ATM or a Web application, thus avoiding the need for multiple applications. As yet another example, a manufacturer can effectively use an SOA to measure a production process, and then make appropriate adjustments to the process that feed back instantly to its chain of suppliers.

When building a software product, such as an SOA, it is known to use "design patterns" to assist in building the product. A design pattern can be defined as a recurring solution to a problem in a context. The context is the environment, surroundings, situation or interrelated conditions within which the problem exists; and typically, the problem is constrained by the context. Accordingly, a solution to the problem refers to the answer to the problem in a context that helps resolve the issues.

A design pattern describes an expert solution to a problem. Typically, a design pattern is documented in a template format, although it may be documented in other ways as well. Design patterns exist that describe solutions to everything from analysis to design and from architecture to implementation. There are design patterns for numerous areas of interest and technologies. For example, design patterns may describe how to work with a specific programming language or a specific industry segment such as the health care field.

A design pattern is a general, repeatable solution to a commonly recurring problem in software design. A design pattern is not a finished design that can be directly transformed into a code, but is a description or template for how to solve a problem that can be used in different situations.

Design patterns can speed up the software development process by providing tested, proven development paradigms. Reusing design patterns can help prevent subtle issues that can cause major problems, and can improve code readability for coders and architects familiar with the patterns.

In general, there is a need for an improved design pattern that facilitates handling of service requests in a data processing system such as a data processing system implemented in an automated Service-Oriented Architecture, and for software development.

SUMMARY OF THE INVENTION

Exemplary embodiments provide a computer implemented method, system, and computer usable program code for handling service requests in a data processing system. A service request from a service requestor is received at one service provider of a plurality of service providers, each of the plurality of service providers adapted to receive service requests from service requesters and being in communication with middleware software and in communication with one another. The received service request is sent to one service acceptor of a plurality of service acceptors, each of the plurality of service acceptors also being in communication with the middleware software and in communication with one another. If the one service acceptor is able to process the request, the one service acceptor processes the request and sends a response back to the one service provider and to each other of the plurality of service acceptors. If the one service acceptor is unable to process the request, it is determined if another one of the plurality of service acceptors is able to process the request and the middleware software is notified of the determination. A service acceptor that is able to process the request accepts and processes the request and provides a result that is delivered to the service requester. Each of the plurality of service requesters, service providers, service acceptors and middleware software store information regarding the servicing of requests in order to speed up processing of requests and to generally improve efficiency.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an exemplary embodiment when read in conjunction with the accompanying drawings, wherein:

FIG. 4 is a diagram that schematically illustrates details of a log for storing information in the design pattern illustrated in FIG. 3; and FIG. 5 is a flowchart that illustrates a method for handling service requests in a data processing system implemented in a Service-Oriented Architecture according to an exemplary embodiment.

DETAILED DESCRIPTION OF THE PREFERRED EMBODIMENT

Figure 1:
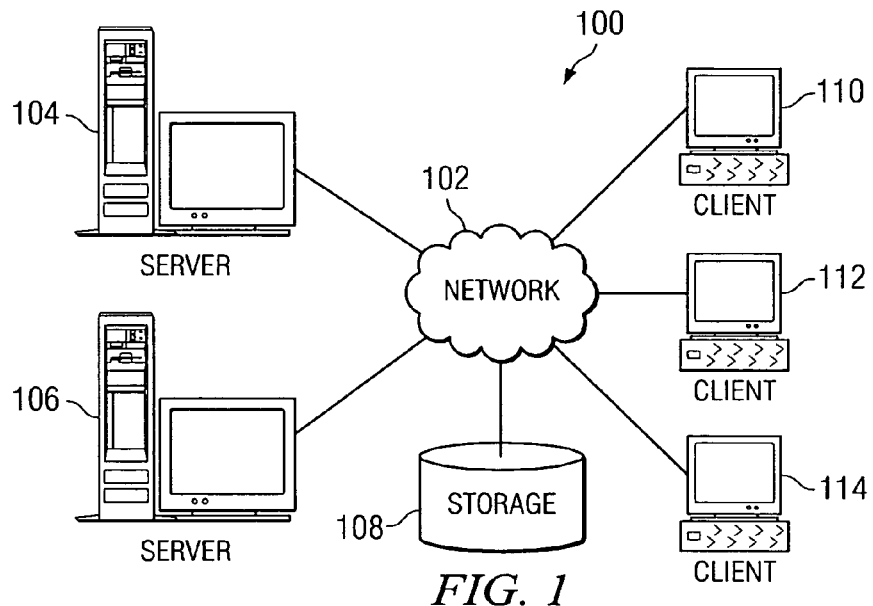
FIG. 1 depicts a pictorial representation of a network of data processing systems in which exemplary embodiments may be implemented.
Figure 2:
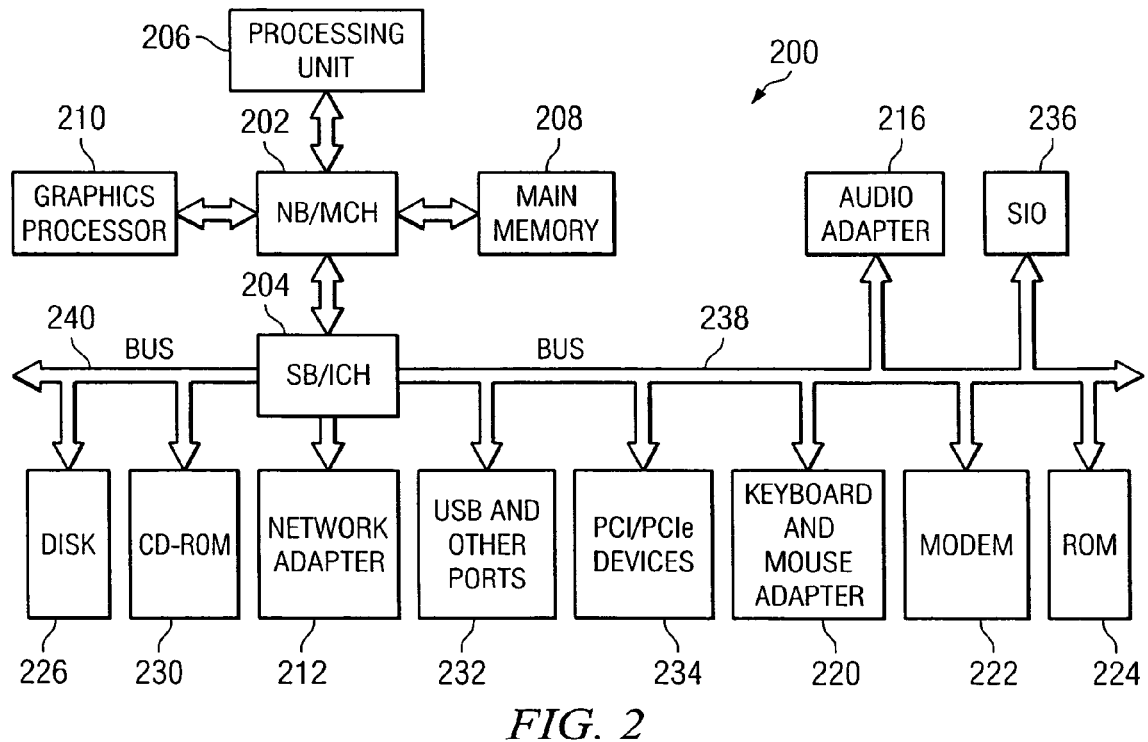
FIG. 2 illustrates a block diagram of a data processing system in which exemplary embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which exemplary embodiments may be implemented. Network data processing system 100 is a network of computers in which exemplary embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which exemplary embodiments may be implemented. Data processing system 200 is an example of a computer, such as server 104 or client 110 in FIG. 1, in which computer usable code or instructions implementing the processes may be located for the exemplary embodiments.

In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java programming system, may run in conjunction with the operating system and provides calls to the operating system from Java programs or applications executing on data processing system 200 (Java and all Java-based trademarks are trademarks of Sun Microsystems, Inc. in the United States, other countries, or both).

Instructions for the operating system, the object-oriented programming system, and applications or programs are located on storage devices, such as hard disk drive 226, and may be loaded into main memory 208 for execution by processor 206. The processes of the illustrative embodiments may be performed by processor 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the exemplary embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

Exemplary embodiments provide a computer implemented method, system and computer usable program code for handling service requests in a data processing system and for facilitating software development. More particularly, exemplary embodiments provide a design pattern for efficiently handling service requests in a data processing system implemented in a Service-Oriented Architecture (SOA).

Figure 3:
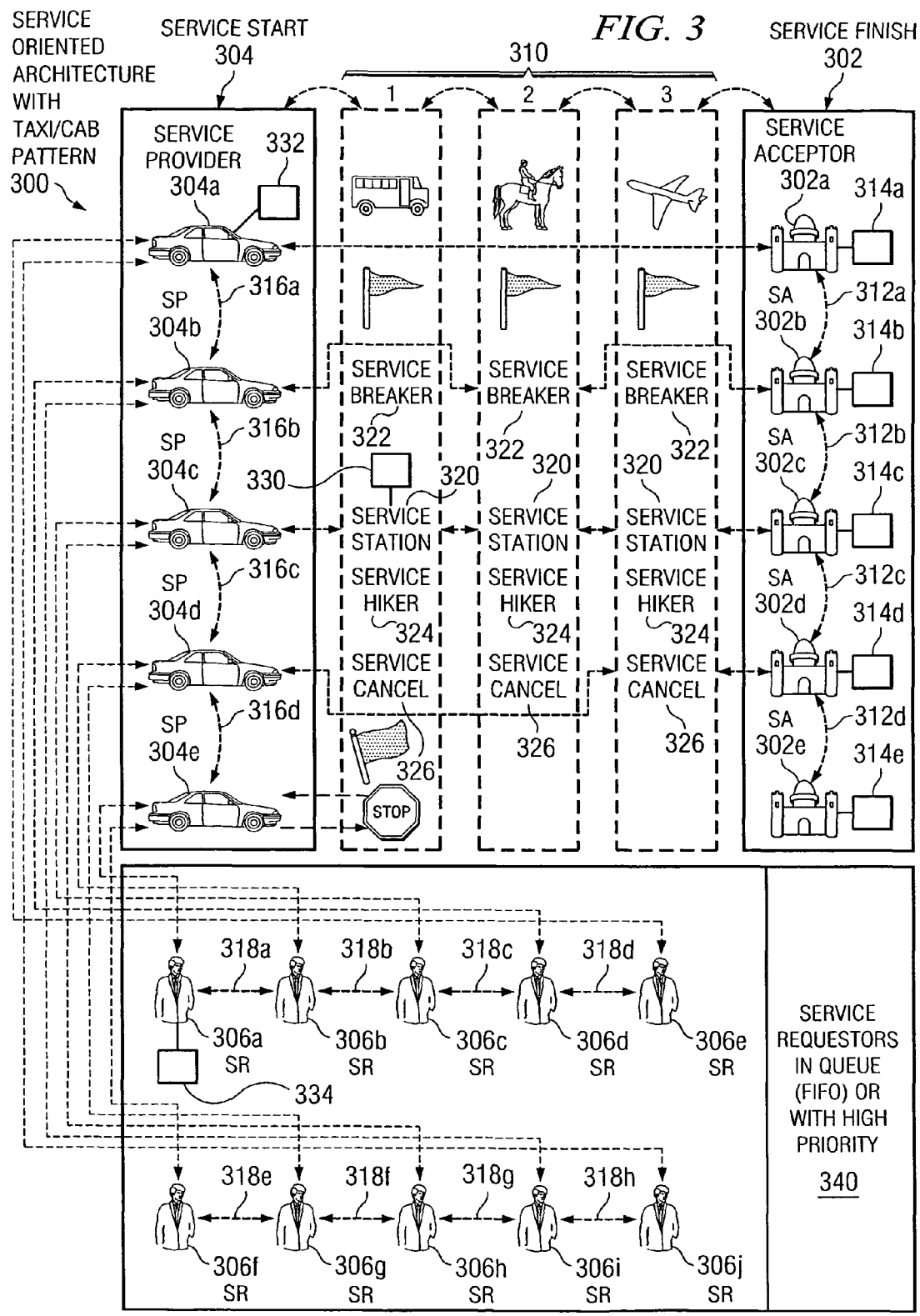
FIG. 3 is a diagram that schematically illustrates a design pattern for handling service requests in a data processing system implemented in a Service-Oriented Architecture according to an exemplary embodiment.

FIG. 3 is a diagram that schematically illustrates a design pattern for handling service requests in a data processing system implemented in a Service-Oriented Architecture according to an exemplary embodiment. More particularly, FIG. 3 illustrates a new design pattern, usually referred to herein as a TAXI or CAB design pattern, in a data processing system implemented in a Service-Oriented Architecture (SOA) although it should be understood that this is intended to be exemplary only as the design pattern can also be used in data processing systems implemented in other ways and for other purposes. In general, the TAXI or CAB design pattern according to exemplary embodiments can be used to provide automated processing whenever an application, interface and/or system is built. Applications and tools can be built utilizing the methodology of exemplary embodiments. The technique can be used whenever software is employed to build systems and applications.

The new TAXI or CAB design pattern according to exemplary embodiments is generally designated by reference number 300, and includes a plurality of service acceptors 302, separately designated as service acceptors 302a, 302b, 302c, 302d and 302e (also sometimes referred to as "applications" or "servers"); and a plurality of service providers 304, separately designated as service providers 304a, 304b, 304c, 304d and 304e. Although five service acceptors and five service providers are illustrated in FIG. 3, this is intended to be exemplary only as TAXI or CAB pattern 300 may include any one or more service acceptors and any one or more service providers.

The plurality of service providers are adapted to receive service requests from a plurality of service requesters 306, separately designated as service requesters 306a, 306b, 306c, 306d, 306e, 306f, 306g, 306h, 306i and 306j. Again, although ten service requesters are shown, this is intended to be exemplary only as the service providers can receive requests from any number of service requesters.

Each of the plurality of service acceptors 302a-302e is in communication with middleware software, generally designated by reference number 310 via one or more interfaces, although only one interface is illustrated in FIG. 3 for each service acceptor for ease in illustration. (Middleware software 310 is often referred to herein as a "service station" as specifically illustrated at 320 in FIG. 3). In addition, each of the plurality of service acceptors is also in communication with each other via a link. In the exemplary embodiment illustrated in FIG. 3, the link is established by chaining as represented by arrows 312a, 312b, 312c and 312d. This is intended to be exemplary only as the service acceptors can also be linked by direct connection or in some other appropriate manner such as by an API or an interface.

Service station 320 handles the travel of service requests, response and other information through TAXI or CAB pattern 300. A service station is considered as comprising different interfaces, media, platforms, Operating Systems, etc. (thus, in FIG. 3, several service stations are illustrated). This is usually true in Enterprise level systems or architectures which are interconnected and depend on each other's services. Service station 320 includes various mechanisms including service breaker 322, service hiker 324, and service cancel 326. These mechanisms will be described in greater detail hereinafter.

Each service acceptor 302a-302e contains a log, 314a, 314b, 314c, 314d and 314e, respectively. As will be explained hereinafter, each log stores information regarding responses to service requests made by service requesters 306a-306j and other information. In addition, each service provider 304a-304e, each service requester 306a-6j, and each service station 310 also includes a log to store information. For ease in illustration, only one service station log 330, one service provider log 332 and one service requester log 334 is illustrated in FIG. 3. The functions of the various logs will be described in detail hereinafter.

Each service provider 304a-304e is also in communication with service station (middleware software) 310 via one or more interfaces, and in communication with each other via a link. In the exemplary embodiment illustrated in FIG. 3, the link is established by chaining as represented by arrows 316a, 316b, 316c and 316d; however, this is also intended to be exemplary only as the service providers can also be linked by direct connection or in some other appropriate manner.

Each of the plurality of service providers 304a-304e is in communication with one or more of the plurality of service requesters 306a-306j (although, for the sake of clarity, only one link (arrow) from each service requester is shown in FIG. 3), and is adapted to receive requests from the service requesters. Service Requestors 306a-306j are also in communication with each other via a link. In the exemplary embodiment illustrated in FIG. 3, the link is established by chaining as represented by arrows 318a, 318b, 318c, 318d, 318e, 318f, 318g and 318h; however, this is also intended to be exemplary only as the service requesters can also be linked by direct connection or in some other appropriate manner. By linking the plurality of service requesters, one or more service requests can travel together to a service acceptor through one or more service providers. For example, when two service requests are to go to the same service acceptor, it may be desirable that they travel to the destination together in most situations. This process is sometimes referred to herein as "multi-grouping".

When a service request is received from a service requester by a service provider, it is first queued by service station 320 as schematically shown at 340, and is then sent to one of service acceptors 302a-302e. As indicated above, if service requests from more than one service requester are identified as going to the same service acceptor, they can ride together toward the same service acceptor. In this regard, a signal is sent back to the service provider about this incident and the information is logged in the logs of both the service station and the service provider. According to an exemplary embodiment, the queue operates in a first in-first out (FIFO) manner, although it also may send requests based on a different priority if desired. It should also be understood that queuing is not required in all exemplary embodiments.

When a service request is sent to a service acceptor, the service acceptor makes a determination if it is able to process the request. If it is able to process the request, the service acceptor processes the request and sends a response back to the service provider via service station 320, which, in turn, sends the response back to the service requestor that made the request.

At the same time, the service acceptor that processed the request sends the response to all of the other service acceptors over links 312a-312d. Each of the other service acceptors, as well as the service acceptor that processed the request, stores information regarding the request and the response in its respective log for possible future use.

If the service acceptor that receives the request is unable to process the request, for example, because of an improper request, or because the service acceptor is busy or down, the service acceptor searches its own log to determine whether another of the plurality of service acceptors can respond to the request. The service acceptor then notifies the service station accordingly, so that the request can be sent to the appropriate service acceptor for processing. If none of the service acceptors is able to process the request, this information travels all the way back to the service requester level and is also logged in the logs at each of the service station, service provider and service requester. In other exemplary embodiments, the logs of one or more of the service requesters, service providers and service stations may be turned off and not receive the information. In general, any or all of the logs may store the same information or only some of the logs may be used as desired.

Thus, in accordance with exemplary embodiments, over a period of time, and as service requests are processed by the plurality of service acceptors, each service acceptor develops a record of the capabilities of each other service acceptor. At the same time, the service station is also made aware of this information; and, as a result, when future requests for services are made, the service station is able to direct the request to the service acceptor that is best able to process the request, thus improving the efficiency of the SOA and generally reducing the time required for a service request to be processed.

FIG. 4 is a diagram that schematically illustrates details of a log for storing information in the design pattern illustrated in FIG. 3, for example, one of logs 314a-314e, 330, 332 and 334 in FIG. 3. The log is generally identified by reference number 400 and is internal to its respective service acceptor or other component. As shown, the log stores service requestor address and service request information 402, information regarding other service acceptors and their services 404, and historical information regarding requests that have been accepted or declined 406 including information regarding the service providers that sent the requests, the paths of the requests through the service station, and service availability. In addition, the log stores information regarding the middleware software, including service breaker, service hiker and service cancel information as shown at 408. This information is intended to be exemplary only of the type of information stored in logs 314a-314e, and in other logs.

In accordance with exemplary embodiments, the service requesters and the service providers actively look for each other. No prior knowledge of the correct service acceptor (application) is required. Although not specifically illustrated in FIG. 3, each service component (requester, provider and acceptor, service station) acts both as a server and a client having a built-in datastructure for holding each other component's address.

Returning to FIG. 3, service station 320 includes mechanisms for controlling the flow of service requests therethrough. Service hiker 324, for example, allows service requests to ride together to a service acceptor if it is identified at the service station that two or more service requests have the same information and are heading to the same destination and can be processed by the same service acceptor.

On some occasions, faulty service requests are stopped at the service station and are sent back to the service provider and discarded (service breaker 322) or are prevented from going any further (service cancel 326).

When multiple service requests come to the same service provider, it will accept all service requests and send the requests to a service acceptor via queuing mechanism 340 based on FIFO or another type of priority. On its way to the appropriate service acceptor, service providers drop off the service requests at the service station (service breaker) and the requests may be directed to more than one service acceptor. This is to provide service request balancing to improve response time. For example, although one service acceptor may be able to process a particular request, it may be faster to distribute the request to two or more service acceptors. Also, if a particular service acceptor is busy, it can transfer a particular service request to the next free service acceptor. In these ways, service acceptors can join in processing a request being handled by one service acceptor to speed up processing and improve overall efficiency.

According to an exemplary embodiment, the communication across different stages is through IPC/TCP/IP/UDP. A search/sort (binary quiksort/other search-sort mechanisms) algorithm is used to identify each service component. The address of each search component is both persistent and non-persistent. When the service providers are booted, the service requester, service provider, service station and service acceptor get the addresses of each other component during run-time thereby making complete service automation possible. Specifically, the service requestor, service provider, service station and service acceptor communicate with each other before an actual request is processed. They also communicate during run time. By knowing where to go, who is requesting, where to reside, etc. full automation is made possible.

In general, TAXI or CAB pattern 300 according to exemplary embodiments enables service access in a SOA in real time; permits service multi-grouping, multi-processing and multi-tasking; and provides service multi-platform support and complete automation. The mechanism permits service hitch hiking and service cancellation. Service registration is normally not necessary, but can be provided if desired.

Exemplary embodiments of TAXI or CAB design pattern 300 also provide inter-service provider communication (ISPC), inter-service acceptor communication (ISAC), inter-service requester communication (ISRC) and inter-service station communication (ISSC), by which components are enabled to communicate among themselves and to store logs and addresses.

In general, with a design pattern according to exemplary embodiments, numerous advantageous features are provided. These include the following:

Each service requester, service provider, service acceptor and service station includes a log that holds information about all other components. As a result, one or more requests can ride together to a service acceptor through one or more service providers.

Prior access can be obtained to service requester information. This is an optional feature that may be included if desired, and can be useful in situations such as a static request (a request that is already known to a service provider).

A service request can be dropped off to the closest service acceptor.

The service station is able to pick up and ride a service requester for load balancing (service load balancing) and to improve overall efficiency There can be any number of service stations, service requesters, service providers and service acceptors (any number from 0 to n where n approaches infinity, although normally there will be at least one of each component). This provides an N-tier architecture and forms a client/server, middleware, distributed environment, etc.

The mechanism uses a search/sort method for service navigation. Doing so permits automation and using mathematical formulas for processing requests, service request balancing, etc.

The mechanism includes a capability of service cancellation and/or a "ticket" (Service Cancel or Service Ticket) for faulty service. Faulty services with improper service request information is noted or logged and the address will be stored. It will be marked as an "ERROR" and "TICKETED" and will not be processed further.

FIG. 5 is a flowchart that illustrates a method for handling service requests in a data processing system implemented in a Service-Oriented Architecture according to an exemplary embodiment. The method is generally designated by reference number 500, and begins by receiving, at one of a plurality of service providers, a service request from one of a plurality of service requesters (Step 502). The plurality of service providers are in communication with a service station (middleware software), and in communication with one another. The received service request is then sent to one of a plurality of service acceptors (applications) that are also in communication with the service station and are in communication with one another (Step 504). The request may be queued in the service station before being sent to the service acceptor to ensure a smooth flow of requests through the system.

A determination is then made by the service acceptor that received the request whether it is able to process the request (Step 506). If the service acceptor is able to process the request (Yes output of Step 506), it processes the request (Step 508), and then sends a response back to the service provider via the service station (Step 510), which, in turn, sends the response to the service requester (Step 512). At the same time, the service acceptor stores the response in its own log and sends the response to the other service acceptors, as well as to the other service requesters, service providers and service stations to be stored in their respective logs (Step 514).

If the service acceptor that received the request is unable to process the request (No output of Step 506), it is determined if another of the plurality of service acceptors is able to process the request and the service station is notified accordingly (Step 516). This determination may be made by the service acceptor examining its log to see if another service acceptor has previously processed such a request. The service station then sends the request to the appropriate service acceptor for processing or notifies the service provider that the system is unable to process the request (Step 518). Either the result or an indication that the service request cannot be processed is then sent beck to the service requester that requested the service (Step 520), and the method ends. As indicated above, this information is also preferably stored in the logs at all levels of the design pattern including service requester, service provider, service station and service acceptor.

The exemplary embodiments thus provide a computer implemented method, system, and computer usable program code for handling service requests in a data processing system. A service request from a service requester is received at one service provider of a plurality of service providers, each of the plurality of service providers adapted to receive service requests from service requesters and being in communication with middleware software. The received service request is sent to one service acceptor of a plurality of service acceptors, each of the plurality of service acceptors being in communication with the middleware software and in communication with one another. If the one service acceptor is able to process the request, the one service acceptor processes the request and sends a response back to the one service provider and to each other of the plurality of service acceptors. If the one service acceptor is unable to process the request, the one service acceptor determines if another one of the plurality of service acceptors is able to process the request and notifies the middleware software of the determination. A service acceptor that is able to process the request accepts and processes the request and provides a result that is delivered to the service requester.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product, comprising:
a non-transitory computer usable storage medium having computer usable program code encoded thereon configured for handling service requests in a data processing system, the computer program product comprising:
computer usable program code configured for receiving, at one service provider of a plurality of service providers, a service request from a service requestor, each of the plurality of service providers adapted to receive service requests from service requestors and being in communication with middleware software;
computer usable program code configured for sending the received service request to one service acceptor of a plurality of service acceptors, each of the plurality of service acceptors being in communication with the middleware software and in communication with one another; and:

when said one service acceptor is able to process said request, said one service acceptor:
  computer usable program code configured for processing the request; and
  computer usable program code configured for sending a response back to said one service provider and to each other of said plurality of service acceptors, wherein the response is stored in a log that is associated with each of said plurality of service acceptors; and
when said one service acceptor is unable to process the request:
  computer usable program code configured for determining if another one of said plurality of service acceptor is able to process the request and further configured for determining if the log associated with the one service acceptor indicates that another one of said plurality of service acceptors has previously processed a corresponding request;
  computer usable program code configured for notifying the middleware software of the determination;
and
  wherein each of said service requestor, service provider and middleware software includes a log for storing information regarding service requests and responses to service requests; and
  wherein when it is determined that another one of said plurality of service acceptors is not able to process the request, storing information regarding inability to process the request in logs of each of the middleware software, the service providers and the service requestors.

2. A system for handling service requests in a data processing system comprising:
  a bus;
  a communications unit connected to the bus;
  a memory connected to the bus, wherein the memory includes a set of computer usable program code; and
  a processor unit connected to the bus, wherein the processor unit executes the set of computer usable program code to perform the steps of:
  receiving, at one service provider of a plurality of service providers, a service request from a service requestor, each of the plurality of service providers adapted to receive service requests from service requestors and being in communication with middleware software;
  sending the received service request to one service acceptor of a plurality of service acceptors, each of the plurality of service acceptors being in communication with the middleware software and in communication with one another;
    when said one service acceptor is able to process said request, said one service acceptor:
      processing the request; and
      sending a response back to said one service provider and to each other of said plurality of service acceptors; and
    when said one service acceptor is unable to process the request:
      a mechanism for determining if another one of said plurality of service acceptor is able to process the request; and
      for notifying the middleware software of the determination; and
  associating a log with each of said service acceptors for storing the response sent to each other of said plurality of service acceptors, and wherein the one service acceptor determines if another one of said plurality of service acceptors is able to process the request by determining if the log associated with the one service acceptor indicates that another one of said plurality of service acceptors has previously processed a corresponding request, and wherein the middleware software, upon being notified that another service acceptor is able to process the request, sends the request to the another service acceptor for processing.

* * * * *